US006245205B1

(12) United States Patent
Schnaibel et al.

(10) Patent No.: US 6,245,205 B1
(45) Date of Patent: Jun. 12, 2001

(54) DIAGNOSTIC ARRANGEMENT FOR A POTENTIOMETRIC ELECTRICALLY HEATED EXHAUST-GAS PROBE FOR CONTROLLING COMBUSTION PROCESSES

(75) Inventors: Eberhard Schnaibel, Hemmingen; Lothar Raff, Remseck, both of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/379,368

(22) Filed: Aug. 23, 1999

(30) Foreign Application Priority Data

Aug. 24, 1998 (DE) ............................................. 198 38 334

(51) Int. Cl.[7] .......................... G01N 27/409; F02D 41/22

(52) U.S. Cl. .......................... 204/401; 204/406; 204/408; 204/424; 123/688

(58) Field of Search ............................ 204/401, 424–429, 204/406, 408; 123/688

(56) References Cited

U.S. PATENT DOCUMENTS

| | | | | |
|---|---|---|---|---|
| 4,310,401 | | 1/1982 | Stahl . | |
| 4,430,191 | * | 2/1984 | Sone et al. | 204/401 |
| 4,434,764 | * | 3/1984 | Hasegawa et al. | 123/688 |
| 5,020,499 | * | 6/1991 | Kojima et al. | 123/688 |
| 5,505,183 | | 4/1996 | Sinha et al. . | |
| 5,804,700 | * | 9/1998 | Kwon et al. | 73/23.32 |
| 5,901,691 | * | 5/1999 | Katoh | 123/688 |
| 5,927,260 | * | 7/1999 | Kishimoto et al. | 123/688 |

FOREIGN PATENT DOCUMENTS

| | | |
|---|---|---|
| 2937048 | 4/1981 | (DE) . |
| 0 841 478 | 5/1998 | (EP) . |

* cited by examiner

*Primary Examiner*—Robert J. Warden, Sr.
*Assistant Examiner*—Kaj K. Olsen
(74) *Attorney, Agent, or Firm*—Walter Ottesen

(57) ABSTRACT

The invention is directed to a diagnostic arrangement for a potentiometric, electrical exhaust-gas probe for the control of combustion processes with a periodic change of the composition of the combusting air/fuel mixture between oxygen deficiency and oxygen excess. The exhaust-gas probe is heated by an electric heater and outputs a probe signal when the exhaust-gas probe operates without fault which changes between a first region of high signal values (oxygen deficiency) and a second region of low signal values (oxygen excess) with the first region and the second region being separated by a third region of values. A fault announcement is outputted when the probe signal lies within the third region longer than a pregiven longest duration. A fault announcement is also outputted when changes of the current supplied to the electric heater occur within the pregiven longest duration and when the probe signal has temporarily left the third region of values after the change of the heater current.

11 Claims, 4 Drawing Sheets

DIAGNOSTIC ARRANGEMENT FOR A POTENTIOMETRIC ELECTRICALLY HEATED EXHAUST-GAS PROBE FOR CONTROLLING COMBUSTION PROCESSES

FIELD OF THE INVENTION

The invention relates to a diagnosis of a potentiometric electrically heated exhaust-gas probe for controlling combustion processes with a periodic exchange between combustions with oxygen deficiency and oxygen excess.

BACKGROUND OF THE INVENTION

A potentiometric electrically heated exhaust-gas probe is disclosed, for example, in U.S. Pat. No. 4,310,401. This probe is used to control combustion processes such as in heater equipment or in internal combustion engines for motor vehicles. For motor vehicles, various countries have statutory requirements as to on-board monitoring of all exhaust-gas relevant components. A fault which can lead to a deterioration of the exhaust gas must be detected and displayed via a fault lamp. In this context, the invention relates especially to the diagnosis of all electrical faults of the exhaust-gas probe during its operation. As electrical fault, especially short circuits of the connecting leads of the probe are noted, such as a short circuit to the battery voltage, a short circuit to ground, a break in the cable, et cetera.

The control of combustion processes takes place often with a so-called two-point control strategy. Here, the probe is subjected to the exhaust gas of the combustion process and distinguishes between oxygen rich and oxygen deficient exhaust gas. For oxygen-rich exhaust gas, the air/fuel mixture, which is supplied to the combustion process, is enriched with fuel until the resulting exhaust gas is oxygen deficient. Thereafter, a leaning of the mixture takes place by reducing the metering of fuel until the occurrence of an oxygen excess in the exhaust gas. In this way, the composition of the combusting air/fuel mixture varies periodically between oxygen deficiency and oxygen excess. The probe signal changes in fault-free probe operation back and forth between a first region of high signal values (oxygen deficiency) and a second region of low signal values (oxygen excess). These two regions are separated by a third region which is run through very rapidly for each change between the first and second regions when the probe operation is free of faults.

A known probe diagnosis evaluates a longer dwell time of the probe signal in the above-mentioned third region as a fault because this performance is typical for an electrical fault such as a break in the signal and ground leads between the probe and the control apparatus. This diagnosis has been shown to be especially reliable for specific types of probes but has shown deficiencies with respect to other types of probes. Especially in the case of planar lambda=1 probes such as disclosed in U.S. Pat. No. 4,310,401, cable breaks in experimental operation have not been detected with sufficient reliability.

SUMMARY OF THE INVENTION

In view of the above, it is an object of the invention to provide a reliable diagnosis of electrical faults in probes of the type disclosed in U.S. Pat. No. 4,310,401.

The diagnostic arrangement of the invention is for a potentiometric, electrical exhaust-gas probe for the control of combustion processes with a periodic change of the composition of the combusting air/fuel mixture between oxygen deficiency and oxygen excess. The exhaust-gas probe is heated by an electric heater and outputs a probe signal when the exhaust-gas probe operates without fault which changes between a first region of high signal values (oxygen deficiency) and a second region of low signal values (oxygen excess) with the first region of high signal values and the second region of low signal values being separated by a third region of values. The diagnostic arrangement includes: means for outputting a fault announcement when the probe signal lies within the third region longer than a pregiven longest duration; and, means for also outputting a fault announcement when changes of the current supplied to the electric heater occur within the pregiven longest duration and when the probe signal has temporarily left the third region of values after the change of the heater current.

The invention is based on the recognition that the problems observed for the planar lambda=1 probe are related to the arrangement of the probe heater and the measurement electrodes on a planar chip. In specific operating states, it can happen that unwanted in-coupling resistances and in-coupling capacitances occur between the probe heater and the Nernst cell of the probe.

The Nernst cell comprises a solid electrolyte and electrodes which, on the one hand, are subjected to the exhaust gas and, on the other hand, are subjected to a reference gas such as air. The probe voltage lies within a plausible voltage region, that is, outside of the above-mentioned third region and can therefore not be detected as a fault by the known probe diagnosis. As a secondary fault, the problem is present that the above-described control of the air/fuel mixture causes the air/fuel mixture to become lean to such an extent that ignition misfires occur. In the extreme case, a catalytic converter, which is used in motor vehicles, can disintegrate and the vehicle itself can be consumed in flames. Before the extreme case occurs, such a leaning of the mixture already causes a significant and detectable deterioration in driving performance.

The advantage of the invention is that all faults, which occur in planar probes, can be reliably detected with an additional expansion of function in the electric probe diagnosis so that the above-mentioned faults and deteriorations cannot occur.

BRIEF DESCRIPTION OF THE DRAWINGS

The invention will now be explained with reference to the drawings wherein.

DESCRIPTION OF THE PREFERRED EMBODIMENTS OF THE INVENTION

Figure 1:
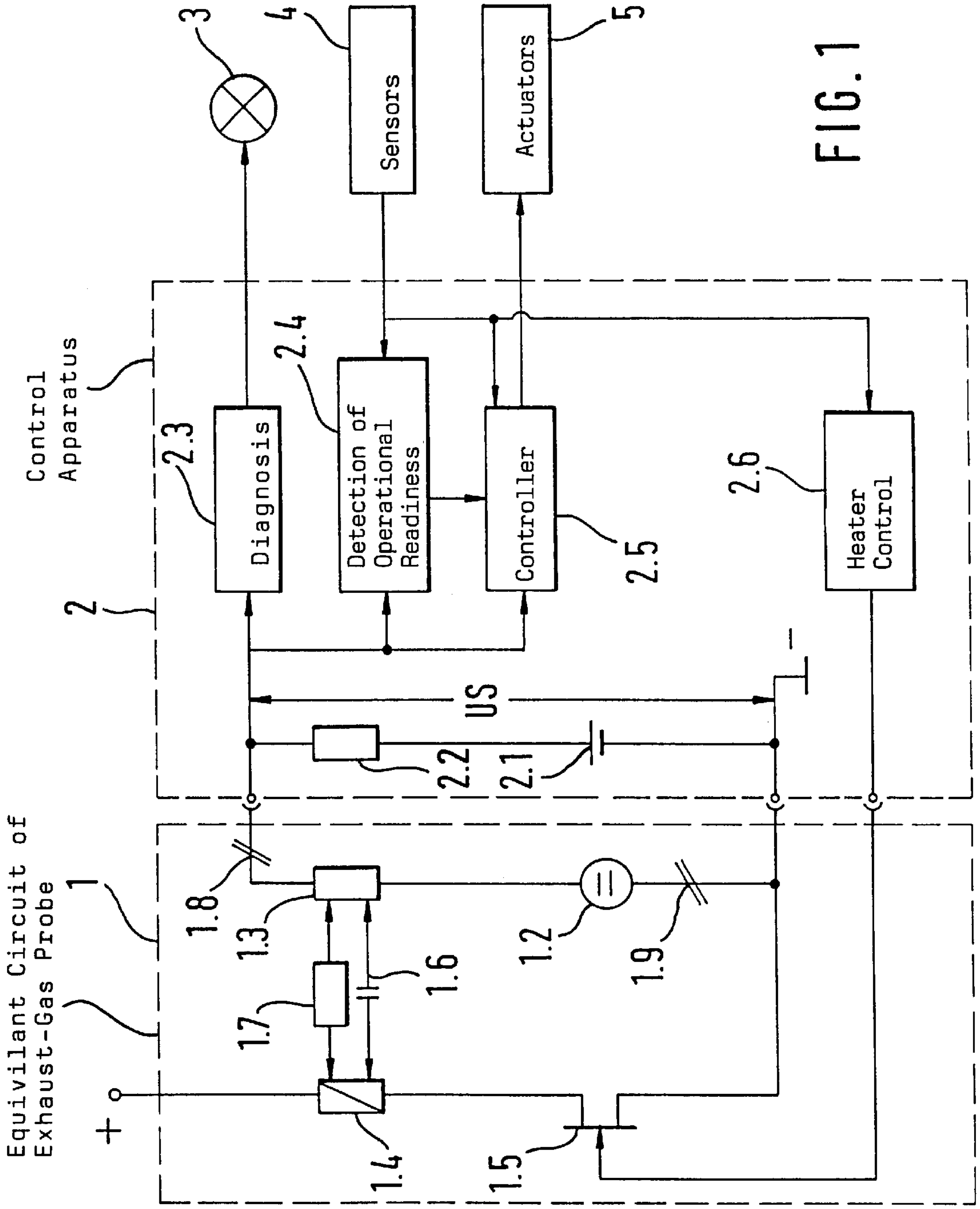
FIG. 1 shows the technical background of the diagnostic arrangement according to the invention.

Reference numeral 1 in FIG. 1 identifies the equivalent circuit of an electrically heated exhaust-gas probe. Reference numeral 1.2 identifies the internal voltage of the probe, the numeral 1.3 the internal resistance of the probe and reference numeral 1.4 identifies an electric heater. A controllable switch 1.5 is provided in the current supply of the heater. In the ideal case, the heater and the probe are electrically separated from each other. However, in the practical case of a close proximity of the probe heater and the probe signal generator, there exists an unwanted coupling resistance 1.7 and an unwanted coupling capacitance 1.6 between the probe signal generator and the probe heater. Reference numeral 1.8 identifies a possible break of the probe signal line and the reference numeral 1.9 a possible break of the probe ground line.

Reference numeral 2 identifies a control apparatus which includes the diagnostic unit 2.3, a probe operational readiness detector 2.4, a controller 2.5, a heater control 2.6 and a probe signal preparation circuit in the form of a countervoltage source 2.1 and a resistor 2.2.

For internal combustion engines, the control apparatus usually includes other functions such as the control of the ignition, exhaust-gas recirculation, tank venting et cetera. These functions are of no significance with respect to the understanding of the invention and are therefore not discussed in the following.

The diagnostic block 2.3 controls, as may be required, the fault lamp 3. Sensor means supplies signals as to the operational conditions of the combustion process to the operational readiness detector 2.4 and the controller 2.5. From these signals, the controller forms drive signals for actuators 5 such as for the fuel-injection valves of an internal combustion engine.

Figure 2:
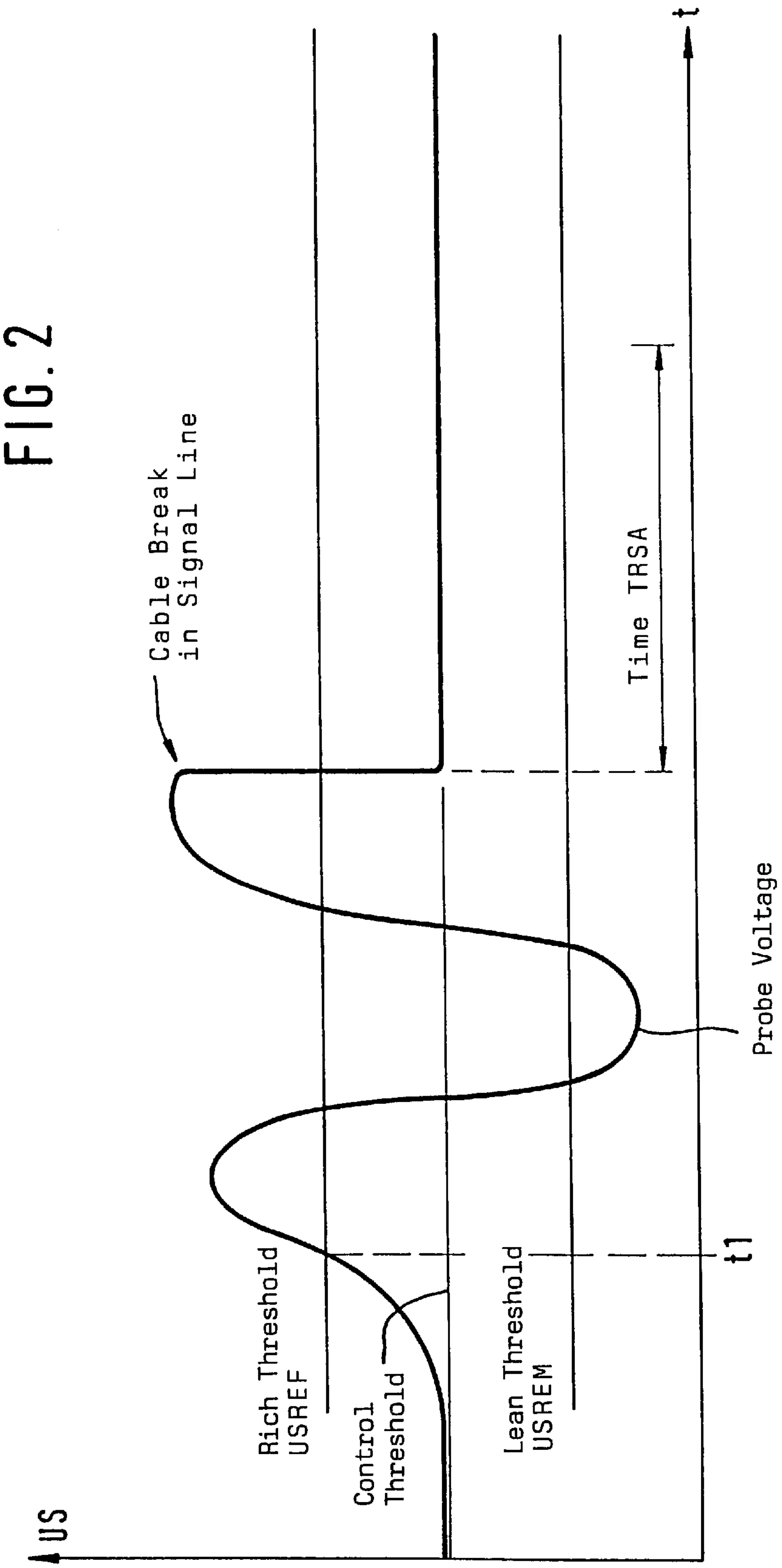
FIG. 2 shows the signal trace of the probe signal as a function of time with and without a fault.

FIG. 2 shows the time-dependent trace of the probe voltage US. In the cold state, the internal resistance Ri of the probe is of high ohmage so that the probe voltage US is dominated by the value of the counter voltage source 2.1, for example 450 minivolts. This corresponds to the probe signal trace at the left edge of FIG. 2. After the probe is warmed to approximately 300° C., the probe voltage at time t1 moves out of the value region between the lower threshold USREM and the upper threshold USREF which the operational readiness detector 2.4 evaluates as an indication for an operationally ready probe. For an operational-ready probe, the controller 2.5 is switched on and, because of the interaction of the controller, control path and probe characteristic, a periodic change between the first region of high signal values and the second region of low signal values develops in the probe signal. Both value regions are separated by the third value region which lies between USREF and USREM.

For the probe shown, a cable break 1.8 in the signal line can be clearly and reliably detected by the diagnosis when the probe voltage US lies between the rich threshold USREF and the lean threshold USREM and therefore on the countervoltage for the delay time TRSA. However, if for the lambda probe shown, a cable break 1.9 occurs in the probe ground, then a connection to ground exists from the plus pole of the supply voltage via the probe heater 1.4, the coupling resistance 1.7, the coupling capacitance 1.6, the counter resistance 2.2 and the countervoltage source 2.1.

Figure 3:
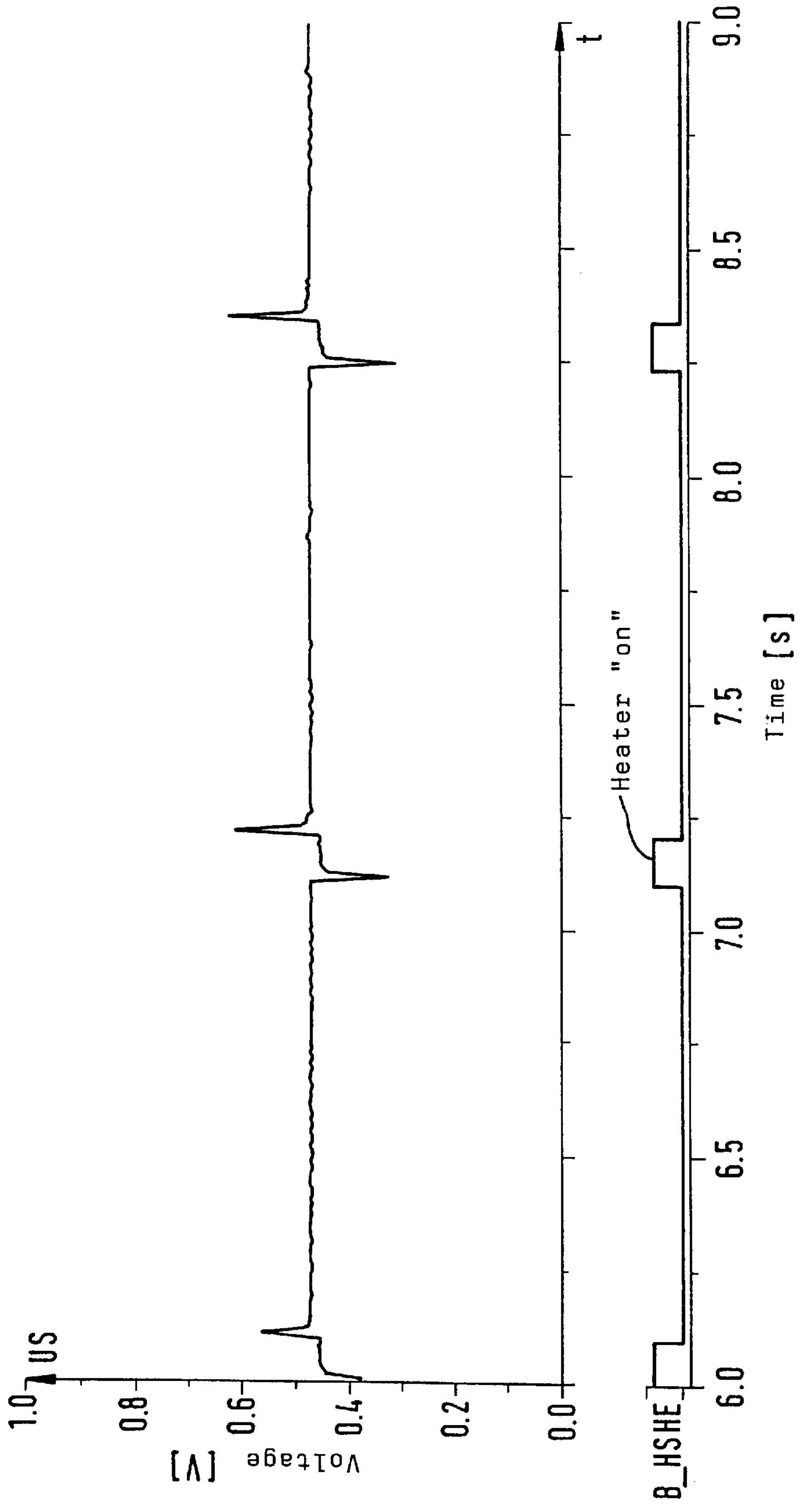
FIG. 3 is a set of curves disclosing the influences of the heater on the probe signal; and, FIG. 4 shows an embodiment of the diagnostic arrangement of the invention in the form of a function block diagram.

If, in this fault case, the probe heater is driven with a specific pulse-duty factor via the heater control 2.6, then an in-coupling capacitance 1.6 is obtained between the heater and the Nernst cell of the probe up to approximately T_exhaust gas=700° C. This effects that with the switching flanks of the heater drive, voltage peaks are present on the probe voltage so that the thresholds USREF and USREM are exceeded. This is shown in FIG. 3.

For a cable break in the probe ground lead, these voltage tips cause the condition that the diagnostic time T1 of approximately 5 seconds cannot elapse because the activation of the time element 4.3 (time T1) is interrupted each time before the 5 seconds are elapsed and therefore the cable break to probe ground cannot be detected. These voltage tips have a time duration of approximately 20 milliseconds and are suppressed in accordance with the diagnosis of the invention. For this purpose, a condition B1 is set when the probe voltage US is located within the bandwidth between the threshold values USREM and USREF which is only withdrawn when the probe signal was outside of the above-mentioned bandwidth for at least a time T2 of approximately 60 milliseconds. However, since the probe voltage is, after the elapse of the voltage tips, already again in the above-mentioned bandwidth after approximately 20 milliseconds, the condition B1 is not withdrawn so that the time T1 can elapse. After elapse of the time T1, the probe operational readiness BBS is withdrawn and the cable break fault BKB is set which leads to driving the fault lamp 3. On the other hand, for a good probe without a cable break, the condition B1 is always set within the above-mentioned bandwidth but withdrawn after leaving the detection band always after the elapse of the time T2 so that no cable interruption fault can be diagnosed.

Figure 4:
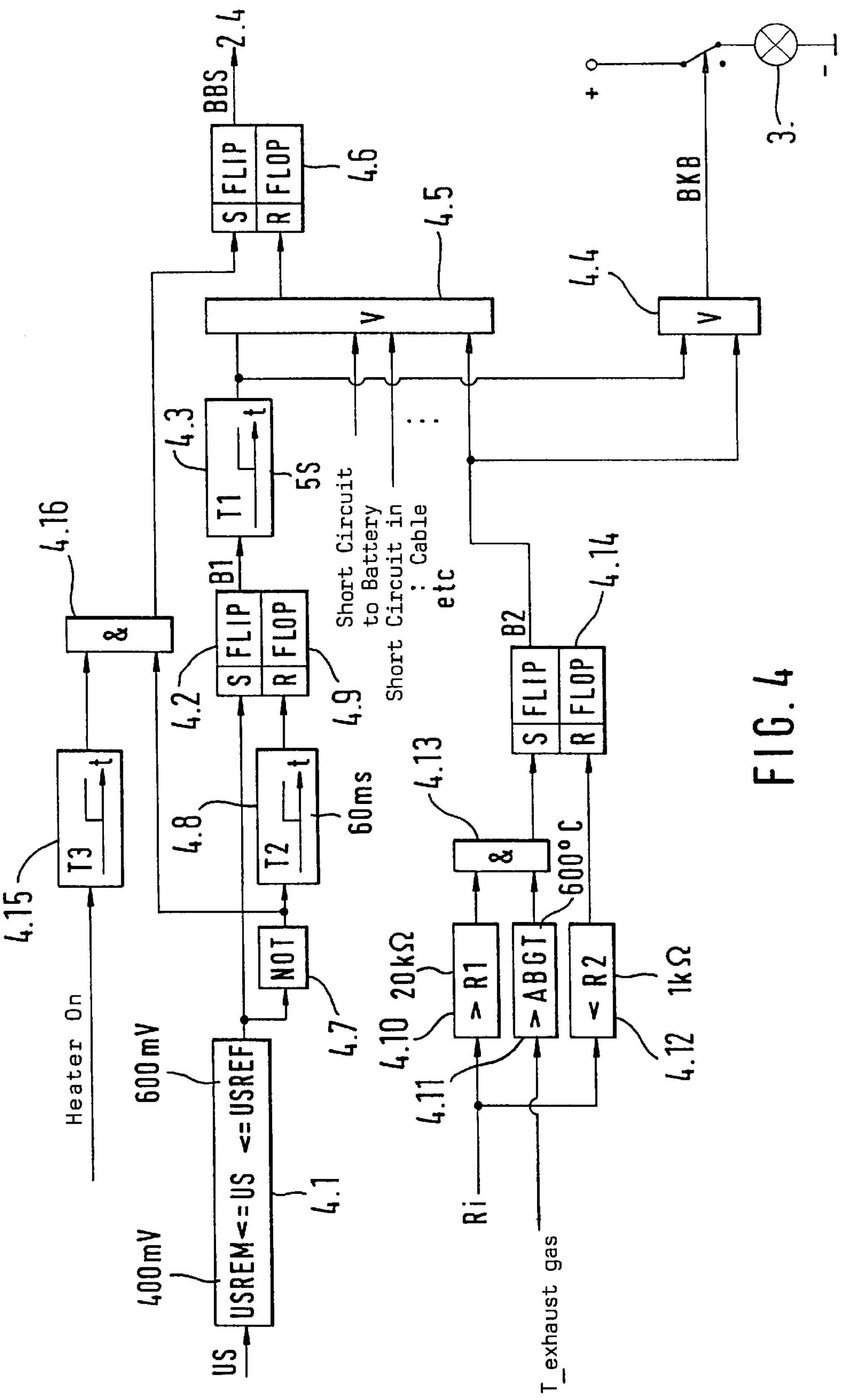

A possible realization of this function is shown in FIG. 4. Block 4.1 checks whether the probe voltage US is within the above-mentioned bandwidth between the threshold values USREM and USREF. If this is the case, block 4.2 sets the condition B1. As a consequence, a time measurement is triggered in block 4.3. If the condition B1 is set longer than a predetermined time T1, then this is evaluated as a signal for a cable break and the fault lamp 3 is switched on via the block 4.4. At the same time, the probe operational readiness is withdrawn via the block 4.5 and block 4.6.

The suppression of the short term disturbance pulses, which are caused by the heater, takes place via blocks 4.7, 4.8 and 4.9. Block 4.7 inverts the output of block 4.1. Stated otherwise, block 4.7 triggers a time measurement in block 4.8 when the probe voltage US leaves the bandwidth which is checked in block 4.1. If the signal remains outside of the bandwidth longer than a predetermined time T2 of, for example, 60 milliseconds, then the condition B1 is withdrawn in block 4.9 thereby interrupting the time measurement in block 4.3. In this way, it is ensured that, in the regular operation of the probe, the time measurement in block 4.3 is again interrupted repeatedly.

If, however, the probe signal remains outside of the bandwidth for only a short time (because of a short-term disturbance pulse caused by the heater), the time T2 does not run before the return of the probe signal into the region between USREM and USREF. Accordingly, the condition B1 is not withdrawn with the occurrence of a short-term disturbance pulse and the time T1 can run.

A further effect is noted for high exhaust-gas temperatures and the high probe temperatures associated therewith. Thus, an in-coupling resistance 1.7 in the region of approximately 100 kiloohms is obtained between the heater and the Nernst cell above an exhaust-gas temperature of 700° C. This resistance causes the condition that the probe voltage US lies in the plausible voltage region above the threshold USREF also for a broken ground lead. During regular operation of the probe, this would correspond to a fuel rich mixture. As a consequence thereof, an intense leaning of the mixture occurs via the lambda controller. From this, ignition misfires can result which can have as a consequence an after reaction of uncombusted air/fuel mixture in the catalytic converter. The temperature of the catalytic converter can then assume impermissibly high values.

To prevent this condition, a rapid diagnosis is required which sets the lambda controller to a neutral value and therefore avoids an impermissibly high leaning of the mixture. For this purpose, the internal resistance Ri of the probe can be used. The internal resistance Ri is computed from the probe voltage US and known values of the circuit. The internal resistance Ri increases steeply with a cable break. If the internal resistance is greater than a threshold value R1 of approximately 20 kiloohms starting from an exhaust-gas temperature of approximately T_exhaust-gas greater than 600° C. (threshold ABGT), then a condition B2 is set and the probe operational readiness BBS is withdrawn and the cable break fault BKB is displayed via the fault lamp 3.

If the cable break fault is again eliminated, then the internal resistance Ri again acquires low ohmage so that, for a threshold value R2 less than a kiloohm, the condition B2 is again withdrawn and the operational readiness is likewise again withdrawn and the cable break fault is no longer displayed. This is realized in FIG. 4 by the blocks 4.10 to 4.14. The exhaust-gas temperature can be determined by a temperature measured in close spacial proximity to the probe or can be modeled from operational characteristic variables of the combustion process.

In addition to detecting the interrupted probe ground, it is advantageously considered for the planar probe after switching on the probe heater that a high-ohmage in-coupling of the heater on the Nernst cell does not trigger the probe operational readiness too early when the probe is still cold. Such an in-coupling is suppressed in that the operational readiness announcement of the probe is delayed by a delay time T3 of approximately 6 seconds. This is realized in FIG. 4 by blocks 4.15 and 4.16.

It is understood that the foregoing description is that of the preferred embodiments of the invention and that various changes and modifications may be made thereto without departing from the spirit and scope of the invention as defined in the appended claims.

What is claimed is:

1. A diagnostic arrangement for a potentiometric, electrical exhaust-gas probe for the control of combustion processes with a periodic change of the composition of the combusting air/fuel mixture between oxygen deficiency and oxygen excess, said exhaust-gas probe being heated by an electric heater and outputting a probe signal when the exhaust-gas probe operates without fault which changes between a first region of high signal values (oxygen deficiency) and a second region of low signal values (oxygen excess) with said first region of high signal values and said second region of low signal values being separated by a third region of values; the diagnostic arrangement comprising:

means for determining the occurrence of a sensor fault when the following conditions are present:

(a) said probe signal lies within said third region at the start and at the end of a pregiven longest duration; and, (b) said probe signal has remained within said third region during said pregiven longest duration except for a possible pregiven temporary duration when said probe signal leaves the third region accompanied by a change in the heater current.

2. The diagnostic arrangement of claim 1, wherein said third region of values includes values from approximately 400 mV to 600 mV.

3. The diagnostic arrangement of claim 1, wherein said pregiven longest duration is 4 to 10 seconds.

4. The diagnostic arrangement of claim 1, wherein said pregiven temporary duration is not longer than 100 ms, so that said probe signal is allowed to leave the third region after a change of the heater current for not longer than 100 ms without ending the determination of an occurrence of a sensor fault.

5. The diagnostic arrangement of claim 1, said exhaust-gas probe having an internal resistance and said diagnostic arrangement further comprising:

means for determining a value for said internal resistance from said probe signal for a high temperature of said exhaust-gas probe; and, means for outputting a fault signal when the above-determined internal resistance exceeds a first predetermined value.

6. The diagnostic arrangement of claim 5, further comprising:

means for measuring the temperature in close proximity to said exhaust-gas probe; and, means for determining the temperature of said exhaust-gas probe from the measured temperature.

7. The diagnostic arrangement of claim 5, further comprising means for modeling the temperature of said exhaust-gas probe from operating characteristic variables of the combustion process.

8. The diagnostic arrangement of claim 5, wherein said first predetermined value for said internal resistance is greater than 15 kohms when the value of the temperature of said exhaust-gas probe is greater than 600° C.

9. The diagnostic arrangement of claim 5, further comprising means for withdrawing said fault signal when the above-determined internal resistance is below a second predetermined value.

10. The diagnostic arrangement of claim 9, wherein said second predetermined value is less than 3 kohms.

11. The diagnostic arrangement of claim 1, wherein said exhaust-gas probe is mounted in a motor vehicle.

* * * * *